United States Patent
Miyake

(10) Patent No.: US 12,168,442 B2
(45) Date of Patent: *Dec. 17, 2024

(54) BRAKING FORCE CONTROL DEVICE

(71) Applicant: TOYOTA JIDOSHA KABUSHIKI KAISHA, Toyota (JP)

(72) Inventor: Kazuki Miyake, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/234,008

(22) Filed: Aug. 15, 2023

(65) Prior Publication Data

US 2023/0382385 A1    Nov. 30, 2023

Related U.S. Application Data

(63) Continuation of application No. 17/073,742, filed on Oct. 19, 2020, now Pat. No. 11,760,353, which is a
(Continued)

(30) Foreign Application Priority Data

Aug. 7, 2018  (JP) .................................. 2018-148733

(51) Int. Cl.
*B60W 30/18*    (2012.01)
*B60T 8/32*     (2006.01)
(Continued)

(52) U.S. Cl.
CPC ..... *B60W 30/18136* (2013.01); *B60T 8/3205* (2013.01); *B60W 10/06* (2013.01);
(Continued)

(58) Field of Classification Search
CPC .... B60W 10/18; B60W 10/184; B60W 10/06; B60W 30/18136; B60W 30/18109
See application file for complete search history.

(56) References Cited

U.S. PATENT DOCUMENTS 6,134,498 A    10/2000  Oba
7,957,856 B2    6/2011  Itoh
(Continued)

FOREIGN PATENT DOCUMENTS

CN    1962332 A     5/2007
CN    107709125 A   2/2018
(Continued)

OTHER PUBLICATIONS

Jun. 29, 2020 Notice of Allowance Issued in U.S. Appl. No. 16/435,668.
(Continued)

*Primary Examiner* — Sherry L Estremsky
(74) *Attorney, Agent, or Firm* — Oliff PLC

(57) ABSTRACT

A control device, system and method that distribute a braking request to at least one of a powertrain and a brake based on a braking request by driver operation and a braking force that is generable by the power train. When the braking request is larger than the braking force that is generable by the powertrain, the device, system and method instruct a controller of the powertrain to generate the braking force that is generable by the powertrain, and to instruct a controller of the brake to generate a braking force corresponding to a difference between the braking request and the braking force that is generable by the powertrain.

5 Claims, 4 Drawing Sheets

Related U.S. Application Data continuation of application No. 16/435,668, filed on Jun. 10, 2019, now Pat. No. 10,807,598.

(51) Int. Cl.
*B60W 10/06* (2006.01)
*B60W 10/184* (2012.01)

(52) U.S. Cl.
CPC ..... *B60W 10/184* (2013.01); *B60W 2520/105* (2013.01); *B60W 2540/10* (2013.01); *B60W 2710/06* (2013.01); *B60W 2710/18* (2013.01); *B60W 2720/106* (2013.01); *B60Y 2300/18133* (2013.01)

(56) References Cited

U.S. PATENT DOCUMENTS

| | | | |
|---|---|---|---|
| 8,040,084 B2 | 10/2011 | Muta | |
| 8,706,379 B2 | 4/2014 | Jang | |
| 9,381,896 B2 | 7/2016 | Takeuchi et al. | |
| 10,076,962 B2 | 9/2018 | Brouwer | |
| 10,675,985 B2 | 6/2020 | Matsuo | |
| 10,759,431 B2 * | 9/2020 | Fritz | B60W 10/08 |
| 11,001,263 B2 | 5/2021 | Shimizu et al. | |
| 11,285,952 B2 * | 3/2022 | Itabashi | B60W 10/184 |
| 11,458,968 B2 * | 10/2022 | Nonami | B60W 30/085 |
| 11,760,353 B2 * | 9/2023 | Miyake | B60W 10/06 477/185 |
| 2003/0205931 A1 * | 11/2003 | Muller | B60Q 1/441 303/20 |
| 2006/0069487 A1 * | 3/2006 | Sychra | B60W 10/184 701/69 |
| 2007/0102208 A1 | 5/2007 | Okuda et al. | |
| 2007/0192010 A1 * | 8/2007 | Carlstrom | B60W 30/18136 701/53 |
| 2009/0048755 A1 | 2/2009 | Tokimasa et al. | |
| 2012/0011841 A1 | 1/2012 | Ogata et al. | |
| 2016/0107649 A1 | 4/2016 | Takeuchi et al. | |
| 2017/0361827 A1 | 12/2017 | Crombez | |
| 2018/0186352 A1 | 7/2018 | Goto | |
| 2018/0304892 A1 | 10/2018 | Tashiro et al. | |
| 2020/0094835 A1 | 3/2020 | Itabashi | |
| 2020/0130673 A1 | 4/2020 | Suzuki | |
| 2021/0171052 A1 | 6/2021 | Sakai et al. | |

FOREIGN PATENT DOCUMENTS

| | | |
|---|---|---|
| EP | 0008495 A1 | 3/1980 |
| JP | 2000-233730 A | 8/2000 |
| JP | 2002-152904 A | 5/2002 |
| JP | 2002-215904 A | 8/2002 |
| JP | 2003-011801 A | 1/2003 |
| JP | 2007-126092 A | 5/2007 |
| JP | 2009-018681 A | 1/2009 |
| JP | 2017-159813 A | 9/2017 |
| WO | 2010/131345 A1 | 11/2010 |
| WO | 2015/004777 A1 | 1/2015 |

OTHER PUBLICATIONS

U.S. Appl. No. 16/435,668, filed Jun. 10, 2019 in the name of Miyake.

U.S. Appl. No. 17/073,742, filed Oct. 19, 2020 in the name of Miyake.

* cited by examiner

BRAKING FORCE CONTROL DEVICE

This is a continuation of U.S. patent application Ser. No. 17/073,742, filed on Oct. 19, 2020, which is a continuation of U.S. patent application Ser. No. 16/435,668 filed on Jun. 10, 2019, which claims priority to Japanese Patent Application No. 2018-148733 filed on Aug. 7, 2018. The entire disclosure of each of the above applications, is incorporated herein by reference in its entirety.

BACKGROUND

1. Technical Field

The present disclosure relates to a braking force control device of a vehicle.

2. Description of Related Art

With improvement of the aerodynamic characteristics of a vehicle, lowering of friction of an engine, reduction in pumping loss, or the like, when an operation amount of an accelerator pedal is small, the vehicle decelerates by a smaller degree than that of the related art. As an example, Japanese Unexamined Patent Application Publication No. 2009-018681 (JP 2009-018681 A) discloses a vehicle that obtains a braking force using a brake so as to decelerate to a predetermined speed when the operation amount of the accelerator pedal is small, even when there is no brake operation by a user.

SUMMARY

According to the related art as in JP 2009-018681 A, when the operation amount of the accelerator pedal and the brake pedal performed by the user is zero or relatively small, the braking force is supplemented. However, a suitable control method for supplementing the braking force has not been sufficiently studied.

The disclosure is to provide a braking force control device capable of executing a suitable braking force control for an operation amount of an accelerator pedal.

A first aspect of the disclosure relates to a braking force control device that controls a braking force applied to a vehicle based on an operation amount of an accelerator pedal of the vehicle. The braking force control device includes a target acceleration calculation unit, a powertrain capability acquisition unit and an instruction unit. The target acceleration calculation unit is configured to acquire the operation amount of the accelerator pedal and calculate a first target acceleration based on the acquired operation amount of the accelerator pedal as a first process of the braking force control device. The powertrain capability acquisition unit is configured to acquire a braking force that is generable by a powertrain. The instruction unit is configured to instruct a controller of the powertrain and a controller of a brake to generate a braking force in the powertrain and the brake, respectively. The instruction unit is configured to, as the first process, when a first braking force for achieving the first target acceleration is equal to or less than the braking force that is generable by the powertrain, instruct the controller of the powertrain to generate the first braking force, and when the first braking force is larger than the braking force that is generable by the powertrain, instruct the controller of the powertrain to generate the braking force that is generable by the powertrain, and instruct the controller of the brake to generate a braking force corresponding to a difference between the first braking force and the braking force that is generable by the powertrain.

According to the first aspect of the disclosure, with respect to the operation amount of the accelerator pedal, the braking force is supplemented. For example, when the same degree of braking force as that of a vehicle before improvement of aerodynamic characteristics of the related art and the like can be obtained in accordance with the operation amount of the accelerator pedal, it is possible to reduce discomfort felt by a user, who is accustomed to driving the vehicle of the related art, during driving.

In the braking force control device according to the first aspect of the disclosure, the target acceleration calculation unit may be further configured to calculate a second target acceleration based on the acquired operation amount of the accelerator pedal, as a second process of the braking force control device, and the instruction unit may be further configured to, as the second process, when a second braking force for achieving the second target acceleration exceeds a maximum value of the first braking force, instruct a brake driver model controller to generate a braking force corresponding to a difference between the second braking force and the maximum value. The brake driver model controller may be configured to cooperatively control the controller of the brake and one or more other devices according to a predetermined vehicle control model, and the brake driver model controller may be mounted on the vehicle. The instruction may be further configured to, as the second process, when a portion of the second braking force that falls within a range up to the maximum value of the first braking force is equal to or less than the braking force that is generable by the powertrain, instruct the controller of the powertrain to generate a braking force corresponding to the portion of the second braking force that falls within the range up to the maximum value of the first braking force. The instruction may be further configured to, as the second proves, when the portion of the second braking force that falls within the range up to the maximum value of the first braking force is larger than the braking force that is generable by the powertrain, instruct the controller of the powertrain to generate the braking force that is generable by the powertrain and instruct the controller of the brake to generate a braking force corresponding to a difference between (i) a braking force corresponding to the portion of the second braking force that falls within the range up to the maximum value of the first braking force and (ii) the braking force that is generable by the powertrain.

According to the aspect, it is possible to generate the second braking force that is different from the first braking force, in accordance with the operation amount of the accelerator pedal, and thus it is possible, for example, to cope with a new operation method of generating a relatively large braking force by the operation of the accelerator pedal.

In the braking force control device according to the first aspect, the first process and the second process may be switched based on an external switching instruction.

According to the aspect, since a user can select the operation method according to preference of the user, convenience is improved.

A second aspect of the disclosure relates to a braking force control device that controls a braking force applied to a vehicle based on an operation amount of an accelerator pedal of the vehicle. The braking force control device includes a target acceleration calculation unit, a powertrain capability acquisition unit, and an instruction unit. The target acceleration calculation unit is configured to acquire the operation amount of the accelerator pedal and calculate a second target acceleration based on the acquired operation amount of the accelerator pedal. The powertrain capability acquisition unit is configured to acquire a braking force that is generable by a powertrain. The instruction unit is configured to instruct a controller of the powertrain and a controller of a brake to generate a braking force in the powertrain and the brake, respectively. The instruction unit is configured to, when a second braking force for achieving the second target acceleration exceeds a predetermined value, instruct a brake driver model controller to generate a braking force corresponding to a difference between the second braking force and the predetermined value, the brake driver model controller being configured to cooperatively control the controller of the brake and one or more other devices according to a predetermined vehicle control model. The brake driver model controller is mounted on the vehicle. The instruction unit is further configured to, when a portion of the second braking force that falls within a range up to the predetermined value is equal to or less than the braking force that is generable by the powertrain, instruct the controller of the powertrain to generate a braking force corresponding to the portion of the second braking force that falls within the range up to the predetermined value. The instruction unit is further configured to, when the portion of the second braking force that falls within the range up to the predetermined value is larger than the braking force that is generable by the powertrain, instruct the controller of the powertrain to generate the braking force that is generable by the powertrain and instruct the controller of the brake to generate a braking force corresponding to a difference between (i) a braking force corresponding to the portion of the second braking force that falls within the range up to the predetermined value and (ii) the braking force that is generable by the powertrain.

According to the second aspect of the disclosure, in accordance with the operation amount of the accelerator pedal, the braking force is supplemented. In particular, when a braking force, which exceeds a predetermined value and cannot be obtained by a vehicle before improvement of aerodynamic characteristics of the related art and the like, is generated in accordance with the operation amount of the accelerator pedal, the increased amount from the predetermined value is reflected in the behavior of the vehicle, such as turning-on of a brake lamp, according to the brake driver model. Since the increase in the braking force and the change in the behavior of the vehicle are suitably matched with each other when a change to a new operation method that generates a relatively large braking force is performed, it is possible to reduce the discomfort felt by a user, who is accustomed to driving the vehicle of the related art, during driving.

As described above, according to the aspects of the disclosure, it is possible to provide a braking force control device capable of executing a suitable braking force control on the operation amount of the accelerator pedal.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Overview

A braking force control device according to embodiments generates a braking force according to an operation amount of an accelerator pedal. Further, when a brake pedal is operated, the braking force according to the operation amount of the accelerator pedal is added to the braking force according to the operation amount of the brake pedal. In this way, it is possible, for example, to imitate characteristics of the braking force of a vehicle of the related art before improvement of aerodynamic characteristics and the like, and to reduce the discomfort felt by a user, who is accustomed to driving the vehicle of the related art, during driving.

First Embodiment

Hereinafter, a first embodiment will be described in detail with reference to the drawings.

Configuration

Figure 1:
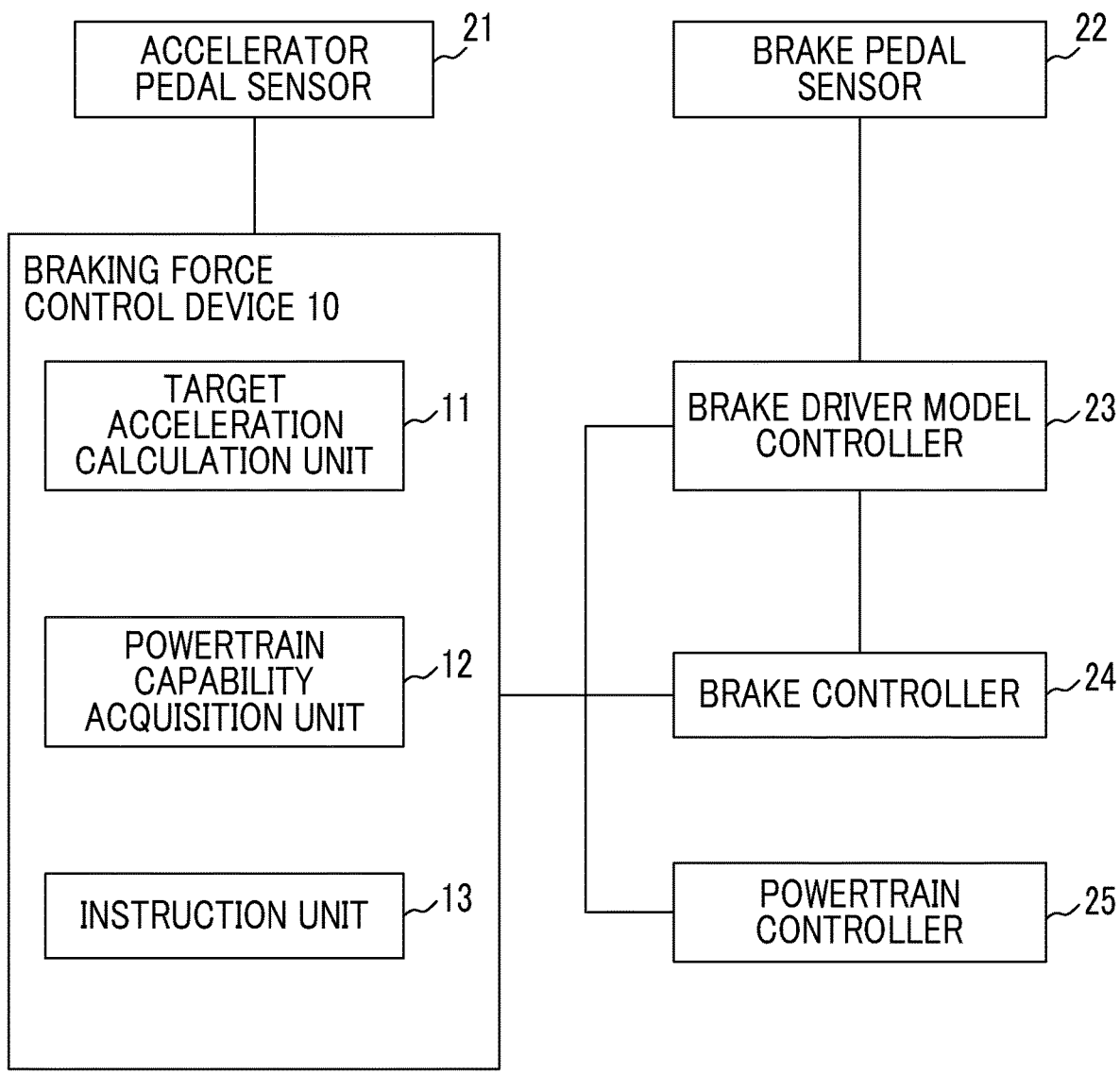
FIG. 1 is a block diagram illustrating a configuration example of a braking force control system according to a first embodiment and a second embodiment.

FIG. 1 illustrates a configuration example of a braking force control system 100 according to the present embodiment. The braking force control system 100 includes a braking force control device 10, an accelerator pedal sensor 21, a brake pedal sensor 22, a powertrain controller 25, a brake controller 24, and a brake driver model controller 23.

The accelerator pedal sensor 21 detects the operation amount of the accelerator pedal by a user. The brake pedal sensor 22 detects the operation amount of the brake pedal by the user.

The powertrain controller 25 monitors conditions of an engine, a transmission, and the like of the powertrain and controls operations of the powertrain. The powertrain controller 25 can calculate a braking force (upper limit value) that can be generated by the engine, the transmission, and the like under the current operation condition, and generate the braking force within the range of the calculated braking force. The braking force is a force for decelerating a vehicle, and the larger the braking force, the larger acceleration of the vehicle, where positive acceleration is defined in a direction opposite to the traveling direction of the vehicle.

The brake controller 24 can control the brake to generate the braking force. The brake driver model controller 23 performs control such that various on-vehicle devices, including the brake controller 24, work in cooperation according to a predetermined vehicle control model regulating the behavior of the whole vehicle related to the brake (hereinafter, referred to as the brake driver model). For example, when the brake pedal sensor 22 detects operation on the brake by the user, the brake driver model controller 23 instructs the brake controller 24 to generate a braking force, and instructs a controller of brake lamps (not shown) to turn on the brake lamps. Besides, various devices for driving assistance or the like are notified of the fact that the operation of the brake pedal is being performed and the operation amount of the brake pedal. In this way, it is possible, for example, to implement an antilock brake system (ABS) that operates based on the operation of the brake and various driving assistance functions such as appropriate distribution control of braking force to each of wheels.

The braking force control device 10 includes a target acceleration calculation unit 11, a powertrain capability acquisition unit 12, and an instruction unit 13. The braking force control device 10 performs control such that various on-vehicle devices including the powertrain controller 25 work in cooperation according to a predetermined vehicle control model regulating the behavior of the whole vehicle related to the accelerator (hereinafter, refer to as the accelerator driver model) to generate the braking force. The target acceleration calculation unit 11 acquires the operation amount of the accelerator pedal from the accelerator pedal sensor 21 and calculates acceleration in the braking direction to be generated for the vehicle. The powertrain capability acquisition unit 12 acquires the braking force that is currently generable by the powertrain, from the powertrain controller 25. The instruction unit 13 determines the braking force each generated by each of the brake and the powertrain, and instructs each of the brake controller 24 and the powertrain controller 25 to generate the braking force.

As an example, the braking force control device 10 can be integrated with an acceleration control device (not shown) to constitute the accelerator driver model controller. The acceleration control device is a device that performs control on the powertrain controller 25 or the like to accelerate the vehicle. For example, when the operation amount of the accelerator pedal is equal to or larger than a predetermined value, the accelerator driver model controller can perform control such that the acceleration control device accelerates the vehicle, and when the operation amount of the accelerator pedal is less than the predetermined value, the accelerator driver model controller can perform control such that the braking force control device 10 decelerates the vehicle.

Process

Figure 2:
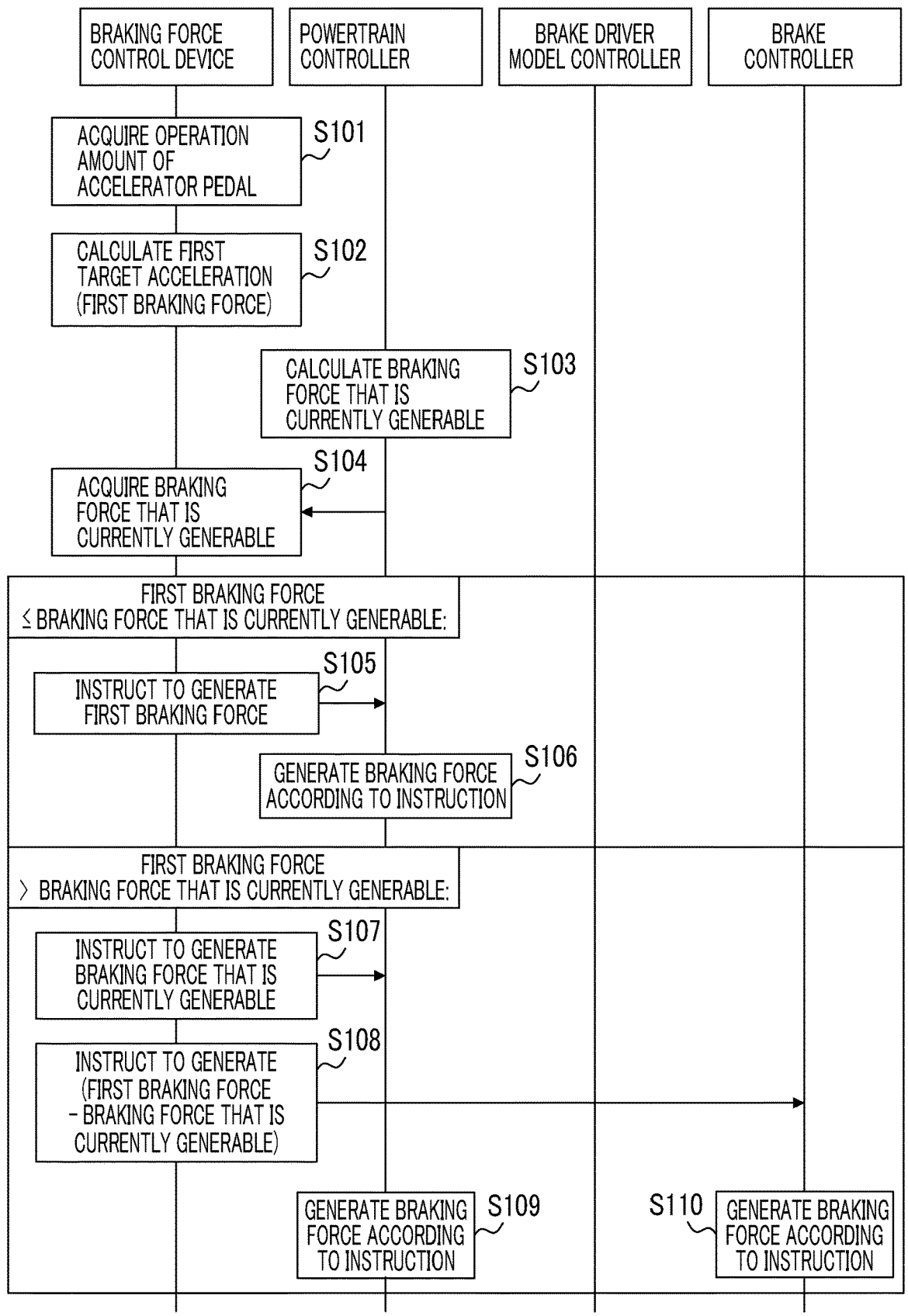
FIG. 2 is a sequence diagram illustrating a process according to the first embodiment.

FIG. 2 is a sequence diagram illustrating a process executed by the braking force control system 100. The process will be described with reference to FIG. 2. The process can be repeatedly executed with a very short period, for example.

(Step S101) The target acceleration calculation unit 11 of the braking force control device 10 acquires the operation amount of the accelerator pedal by the user from the accelerator pedal sensor 21.

(Step S102): The target acceleration calculation unit 11 of the braking force control device 10 calculates a first target acceleration corresponding to the acquired operation amount of the accelerator pedal. The first target acceleration can be converted into a first braking force representing the braking force corresponding to the acquired operation amount of the accelerator pedal. The calculation of the first target acceleration can be performed, for example, by referring to a table in which the first target acceleration corresponding to the operation amount of the accelerator pedal is determined in advance. For example, the table reflects characteristics of the braking force generated for the operation amount of the accelerator pedal when the operation amount of the brake pedal is zero in the vehicle of the related art before improvement of the aerodynamic characteristics of a vehicle, lowering of friction of an engine, reduction in pumping loss, or the like. That is, as an example, the first braking force is the braking force that would be generated by the vehicle of the related art. The table may be determined according to other factors such as the speed of the vehicle, in addition to the operation amount of the accelerator pedal. For example, in a state where the operation amount of the accelerator pedal is zero (fully closed) and in a state where the vehicle travels at a predetermined vehicle speed, the first target acceleration can be, for example, about $-0.5$ m/s$^2$ where the traveling direction of the vehicle is defined as the positive direction. Further, the calculation of the first target acceleration may be performed by a predetermined calculation formula instead of referring to the table.

(Step S103): The powertrain controller 25 calculates the braking force that is currently generable by the powertrain.

(Step S104): The powertrain capability acquisition unit 12 of braking force control device 10 acquires the braking force that is currently generable by the powertrain, from the powertrain controller 25.

(Step S105): When the first braking force is equal to or less than the braking force that is currently generable by the powertrain, step S105 and step S106 are executed. In step S105, the instruction unit 13 of the braking force control device 10 instructs the powertrain controller 25 to generate the first braking force.

(Step S106): The powertrain controller 25 controls the powertrain to generate the braking force according to the instruction in step S105. Then, the process ends.

(Step S107): When the first braking force exceeds the braking force that is currently generable by the powertrain, step S107 to step S110 are executed. In step S107, the instruction unit 13 of the braking force control device 10 instructs the powertrain controller 25 to generate the braking force that is currently generable.

(Step S108): The instruction unit 13 of the braking force control device 10 instructs the brake controller 24 to generate the braking force corresponding to difference between the first braking force and the braking force that is currently generable by the powertrain.

(Step S109): The powertrain controller 25 controls the powertrain to generate the braking force according to the instruction in step S107.

(Step S110): The brake controller 24 generates the braking force according to the instruction in step S108. The brake controller 24 may monitor the condition of the brake so as to calculate the braking force that is currently generable by the brake, such that, in step S108, the instruction unit 13 acquires, from the brake controller 24, a braking force that is currently generable by the brake and makes instruction of the generation of the braking force within the range of the acquired braking force. Then, the process ends.

In the process described above, it is assumed that the operation amount of the brake pedal is zero. When the operation amount of the brake pedal is not zero, in parallel with the process described above, the brake driver model controller 23 performs a process according to the brake driver model, such as instructing the brake lamp controller to turn on the brake lamps based on the operation amount of the brake pedal. In addition, the brake driver model controller 23 instructs the brake controller 24 to generate the braking force corresponding to the operation amount of the brake pedal. The brake controller 24 generates the braking force according to the instruction from brake driver model controller 23. When the brake controller 24 receives, directly from the braking force control device 10, an instruction to generate the braking force in step S108, in step S110, the braking force corresponding to the sum of the braking force according to the instruction from the braking force control device 10 and the braking force according to the instruction from the brake driver model controller 23 may be generated.

It is possible to continuously control the braking force during traveling of the vehicle by repeating the process described above. Furthermore, it is possible to execute the process described above by appropriately modifying each of the above steps or changing the order of the steps.

Effect

In the first embodiment, a predetermined braking force corresponding to the operation amount of the accelerator pedal is generated. For example, the characteristics of the braking force of the vehicle of the related art before improvement, such as improvement of the aerodynamic characteristics are reflected, which makes it possible to make the braking force according to the operation amount of the accelerator pedal equivalent to the braking force of the vehicle of the related art. In this way, the discomfort felt by the user who is accustomed to driving the vehicle of the related art during driving can be reduced. Furthermore, when the generated braking force exceeds the braking force that is generable by the powertrain, the braking force corresponding to the amount of the portion exceeding the braking force that is generable by the powertrain is generated by the brake, but the instruction to do so is directly made to the brake controller without passing through the brake driver model controller. Therefore, since the brake is considered not to work in the drive model when the user is not stepping on the brake pedal, even if the brake is actually working, the process based on the operation of the brake pedal, such as turning on the brake lamps, is not executed, and operations of the vehicle exclusive to the operation of the brake is not suppressed. For this reason, it is possible to more appropriately reduce the discomfort felt by the user during driving. Further, when the powertrain is preferentially controlled to generate the braking force by driving wheels, a variation characteristic of the pitch angle which is closer to that at the time when the engine brake of the vehicle of the related art occurs can be obtained than when merely the brake is controlled to generate the braking force by four wheels. Accordingly, it is possible to reduce the discomfort felt by the user during driving. In addition, in step S110 described above, when the braking force by the brake is generated at driving wheels, the variation characteristic of the pitch angle close to that at the time when the engine brake in the vehicle of the related art can be obtained, which is desirable.

Second Embodiment

Hereinafter, a second embodiment will be described in detail with reference to the drawings. The configuration of the braking force control system 100 according to the present embodiment is the same as that the braking force control system according to the first embodiment, but the process thereof are different.

Process

Figure 3A:
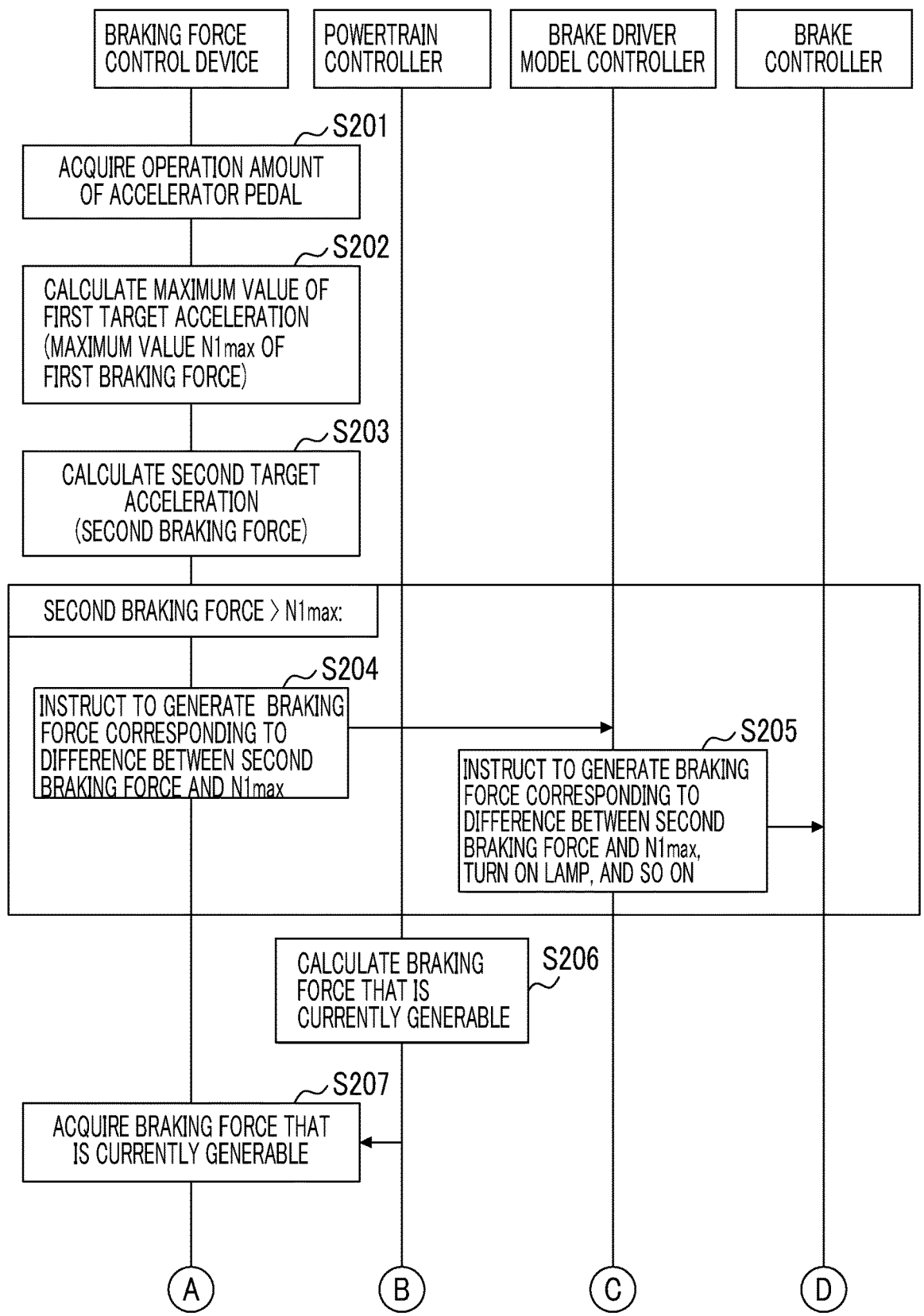
FIG. 3A is a sequence diagram illustrating a process according to the second embodiment.
Figure 3B:
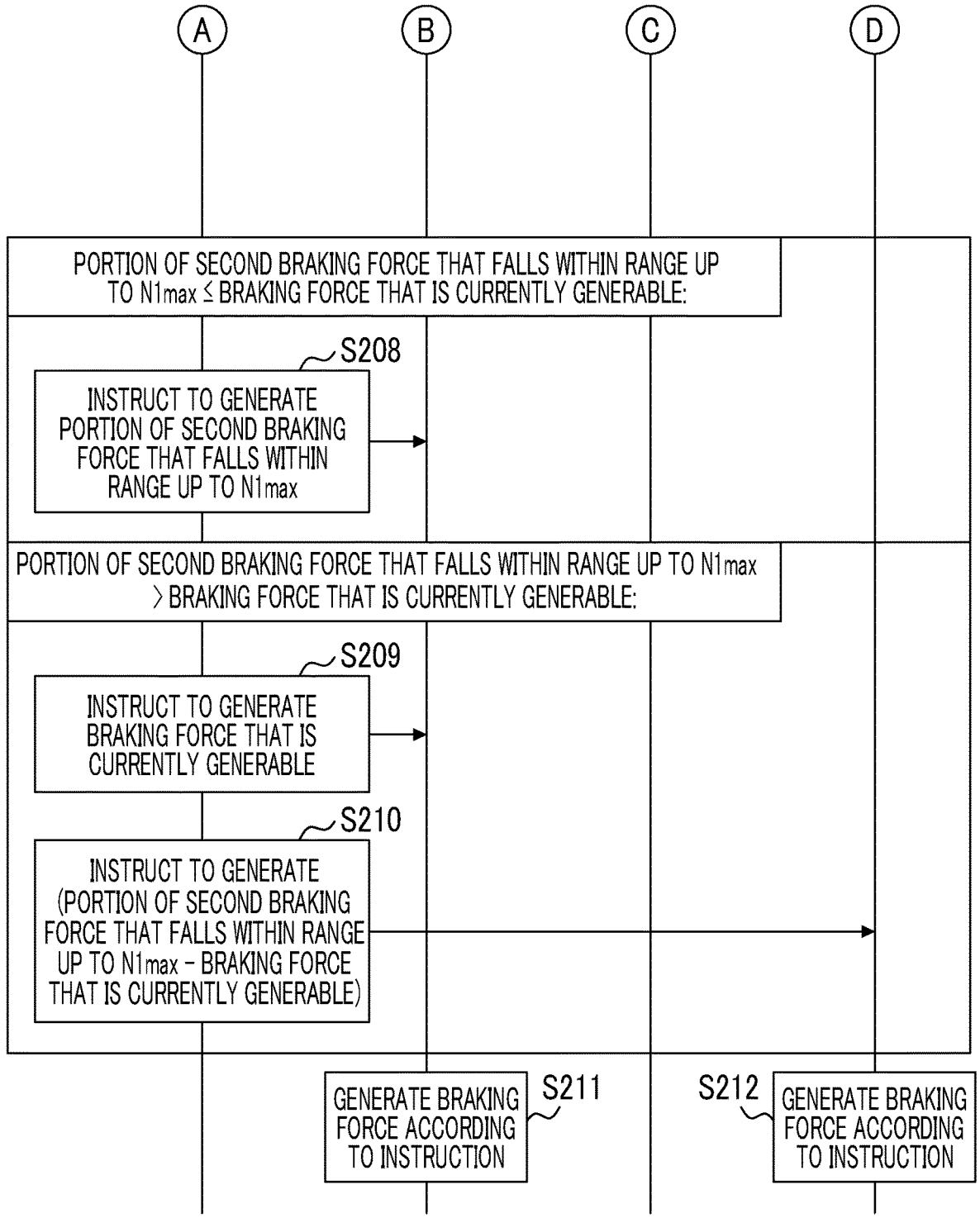
FIG. 3B is a sequence diagram illustrating a process according to the second embodiment.

FIGS. 3A and 3B are sequence diagrams illustrating a process which the braking force control system 100 performs. The process will be described with reference to FIGS. 3A and 3B. The process can be repeatedly executed with a very short period, for example.

(Step S201): The target acceleration calculation unit 11 of the braking force control device 10 acquires the operation amount of the accelerator pedal by the user from the accelerator pedal sensor 21 as in step S101.

(Step S202): The target acceleration calculation unit 11 of the braking force control device 10 calculates the first braking force as in step S102. The target acceleration calculation unit 11 calculates the maximum value of the first braking force which the target acceleration calculation unit 11 has calculated in step S102 of the first embodiment. Hereinafter, the maximum value is referred to as the maximum value of the first braking force and is also denoted as N1max. The maximum value of the first braking force can be calculated by obtaining the maximum value of the first target acceleration using the table or the calculation formula described in above step S102. The maximum value of the first braking force is the maximum value of the braking force that can be generated according to the operation amount of the accelerator pedal when the operation amount of the brake pedal is zero in the vehicle of the related art before improvement of the aerodynamic characteristics, lowering of friction of the engine, reduction in pumping loss, or the like. Furthermore, the maximum value N1max of the first braking force may be a predetermined value according to a predetermined model representing the characteristics of the vehicle of the related art.

(Step S203): The target acceleration calculation unit 11 of the braking force control device 10 calculates a second target acceleration corresponding to the acquired operation amount of the accelerator pedal. The second target acceleration can be converted into a second braking force representing a braking force corresponding to the acquired operation amount of the accelerator pedal. Similar to the calculation of the first target acceleration, the calculation of the second target acceleration can be performed, for example, by referring to a table in which second target acceleration corresponding to the operation amount of the accelerator pedal is determined in advance. For example, in a new operation method for a vehicle (hereinafter, referred to as an one-pedal operation method) which generates a larger braking force than a method of the related art by the operation of reducing the amount of depression of the accelerator pedal even without operation of the brake by the user, the table reflects characteristics of the braking force generated for the operation amount of the accelerator pedal when the operation amount of the brake pedal is zero. That is, as an example, the second braking force is a braking force in the one-pedal operation method, and for the same operation amount of the accelerator pedal, the second braking force is larger than the first braking force. The table may be determined according to other factors such as the speed of the vehicle, in addition to the operation amount of the accelerator pedal. For example, in a state where the operation amount of the accelerator pedal is zero (fully closed) and at a predetermined vehicle speed, the second target acceleration can, for example, be set to be larger than the first target acceleration under the same condition in terms of absolute value, and be about $-3$ m/s$^2$ where the traveling direction of the vehicle is defined as the positive direction. Further, the calculation of the second target acceleration may be performed by a predetermined calculation formula instead of referring to the table.

(Step S204): When the second braking force is larger than the maximum value (N1max) of the first braking force, the instruction unit 13 of the braking force control device 10 instructs the brake driver model controller 23 to generate a braking force corresponding to a difference between the second braking force and N1max. When the second braking force is equal to or less than N1max, the process proceeds to step S206.

(Step S205): The brake driver model controller 23 instructs the brake controller 24 to generate a braking force corresponding to the difference between the second braking force and the maximum value of the first braking force, according to the instruction that has been received in step S204. In addition, the brake driver model controller 23 performs a process according to the brake driver model, for example, instructs the brake lamp controller to turn on the lamps.

(Step S206): The powertrain controller 25 calculates the braking force that is currently generable by the powertrain as in step S103.

(Step S207): The powertrain capability acquisition unit 12 of the braking force control device 10 acquires the braking force that is currently generable by the powertrain from the powertrain controller 25, as in step S104.

(Step S208): When a portion of the second braking force that falls within a range up to N1max (meaning the second braking force when the second braking force is equal to or less than N1max, and N1max when the second braking force is larger than N1max) is equal to or less than the braking force that is currently generable by the powertrain, the instruction unit 13 of the braking force control device 10 instructs the powertrain controller 25 to generate the portion of the second braking force that does not exceed N1max. Then, the process proceeds to step S211.

(Step S209): When the portion of the second braking force that falls within the range up to N1max is larger than the braking force that is currently generable by the powertrain, the instruction unit 13 of the braking force control device 10 instructs the powertrain controller 25 to generate the braking force that is currently generable.

(Step S210): The instruction unit 13 of the braking force control device 10 instructs the brake controller 24 to generate the braking force corresponding to difference between the portion of the second braking force that falls within the range up to N1max and the braking force that is currently generable by the powertrain.

(Step S211): The powertrain controller 25 controls the powertrain to generate the braking force according to the instruction in step S208 or step S209.

(Step S212): The brake controller 24 generates the braking forces according to the instructions described above. That is, when the brake controller 24 receives one of the instruction in step S205 or the instruction of step S210, the brake controller 24 generates the corresponding braking force. In addition, both the instruction of step S205 and the instruction of step 210 are received, the brake controller 24 generates the braking force corresponding to the sum of the braking force according to the instruction in step S205 and the braking force according to the instruction in step S210. Then the process ends.

In the process described above, it is assumed that the operation amount of the brake pedal is zero. When the operation amount of the brake pedal is not zero, in step S205 described above, the brake controller 24 may be instructed to generate the braking force obtained by adding the braking force corresponding in addition to the acquired operation amount of the brake pedal to the braking force according to the instruction from the braking force control device 10, and the process according to the brake driver model may also be performed based on the added braking force.

It is possible to continuously control the braking force during traveling of the vehicle by repeating the process described above. Furthermore, it is possible to execute the process described above by appropriately modifying each of the above steps or changing the order of the steps.

Effect

In the present embodiment, for example, even without operation of the brake by the user, by the operation of reducing the amount of depression of the accelerator pedal, it is possible to cope with the one-pedal operation method which decelerates the vehicle more positively than the related art. In this case, the brake driver model controller is instructed to generate the braking force obtained by subtracting, from the braking force desired to be generated, the maximum braking force generated corresponding to the operation amount of the accelerator pedal in the vehicle of the related art before improvement of aerodynamic characteristics and the like, and the process for the instruction to generate the braking force is executed according to the driver model. That is, the portion of the braking force, which corresponds to the operation amount of the accelerator pedal when it is assumed that change has been made to the one-pedal operation method in the vehicle of the related art and which exceeds the maximum braking force generated in the vehicle of the related art, is reflected in the behavior of the vehicle such as turning on the brake lamps according to the brake driver model. In this way, since it is possible to provide, to a user who is accustomed to driving the vehicle of the related art, a sense that the increase in the braking force due to the change to the one-pedal operation method and the change in the behavior of the vehicle are suitably matched with each other, it is possible to reduce the discomfort when change to the one-pedal operation method is made. In the one-pedal operation method, a relatively large braking force is generated merely by reducing the amount of depression of the accelerator pedal. However, since the control on the vehicle is performed according to the brake driver model in the present embodiment, it is possible to allow functions, such as the function by the ABS that operates based on the operation of the brake, to be performed in cooperation, and to appropriately distribute the braking force to each of the wheels to suppress sideslip or the like, which are desirable.

Modification 1

The braking force control device 10 may be capable of receiving, from the user or the like, a switching instruction for specifying whether or not to switch to the one-pedal operation method. In this way, the preference of the user is reflected in the generated amount of the braking force, which leads to improvement of convenience. When the user selects the one-pedal operation method, the braking force control device 10 may execute the process according to the second embodiment as the second process, and when the user does not select the one-pedal operation method, the braking force control device 10 may execute the process according to the first embodiment as the first process.

Modification 2

The braking force control device 10 may prepare a plurality of methods for calculating the first braking force or the second braking force, which are described above. For example, the target acceleration calculation unit 11 can switch calculation methods according to the driving mode, such as a saving mode in which fuel consumption is suppressed more than usual or a sports mode in which the allowable range of the acceleration and deceleration of the vehicle is enlarged more than usual, to calculate different target braking forces for the same operation amount of the accelerator pedal. In this way, each of driving modes can be appropriately handled.

Although the embodiments have been described above, the disclosure can be regarded as a braking force control device, a braking force control system, a braking force control method that is executed by a controller included in the braking force control device, a braking force control program and a computer readable non-transitory recording medium storing the braking force control program, a vehicle, and the like.

The disclosure is useful for the braking force control device mounted on a vehicle or the like.

What is claimed is:

1. A control device mounted on a vehicle, the control device comprising:
one or more processors configured to:
acquire a first braking force based on an operation amount of an acceleration pedal when a driver operation is performed on the acceleration pedal;
calculate a maximum value of the first braking force, wherein the maximum value of the first braking force is a maximum value that can be generated according to the operation amount of the accelerator pedal when an operation amount of a brake pedal is zero;
calculate a second braking force corresponding to the operation amount of the accelerator pedal;
when the second braking force is larger than the maximum value of the first braking force, instruct a controller of the brake to generate a third braking force corresponding to a difference between the second braking force and the maximum value of the first braking force;
acquire a fourth braking force that is generable by a powertrain; and
when a portion of the second braking force within a range up to the maximum value is larger than the fourth braking force that is generable by the powertrain, instruct a controller of the powertrain to generate the fourth braking force that is generable by the powertrain, and instruct the controller of the brake to generate the third braking force corresponding to a difference between the portion of the second braking force that falls within the range up to maximum value and the fourth braking force that is generable by the powertrain.

2. A method executed by a computer of a manager mounted on a vehicle, the method comprising:
acquiring a first braking force based on an operation amount of an acceleration pedal when a driver operation is performed on the acceleration pedal;
calculating a maximum value of the first braking force, wherein the maximum value of the first braking force is a maximum value that can be generated according to the operation amount of the accelerator pedal when an operation amount of a brake pedal is zero;
calculating a second braking force corresponding to the operation amount of the accelerator pedal;
when the second braking force is larger than the maximum value of the first braking force, instructing a controller of the brake to generate a third braking force corresponding to a difference between the second braking force and the maximum value of the first braking force;
acquiring a fourth braking force that is generable by a powertrain; and
when a portion of the second braking force within a range up to the maximum value is larger than the fourth braking force that is generable by the powertrain, instructing a controller of the powertrain to generate the fourth braking force that is generable by the powertrain, and instructing the controller of the brake to generate the third braking force corresponding to a difference between the portion of the second braking force that falls within the range up to maximum value and the fourth braking force that is generable by the powertrain.

3. A system mounted on a vehicle, the system comprising:
a manager; and
a communication device configured to receive, from the manager, a first braking force as a braking request,
wherein the manager comprises one or more processors configured to:
acquire a first braking force based on an operation amount of an acceleration pedal when a driver operation is performed on the acceleration pedal;
calculate a maximum value of the first braking force, wherein the maximum value of the first braking force is a maximum value that can be generated according to the operation amount of the accelerator pedal when an operation amount of a brake pedal is zero;
calculate a second braking force corresponding to the operation amount of the accelerator pedal;
when the second braking force is larger than the maximum value of the first braking force, instruct a controller of the brake to generate a third braking force corresponding to a difference between the second braking force and the maximum value of the first braking force;
acquire a fourth braking force that is generable by a powertrain; and
when a portion of the second braking force within a range up to the maximum value is larger than the fourth braking force that is generable by the powertrain, instruct a controller of the powertrain to generate the fourth braking force that is generable by the powertrain, and instruct the controller of the brake to generate the third braking force corresponding to a difference between the portion of the second braking force that falls within the range up to maximum value and the third braking force that is generable by the powertrain.

4. A vehicle equipped with the control device according to claim 1.

5. The control device according to claim 1, wherein the one or more processors are configured to notify a driving assistance device of information on an operation amount of a brake pedal performing a brake pedal operation.

* * * * *